Jan. 14, 1964    W. J. NEKOLA ET AL    3,117,665
ARTICLE COMBINER FOR CONVEYORS
Filed Aug. 28, 1961    3 Sheets-Sheet 3
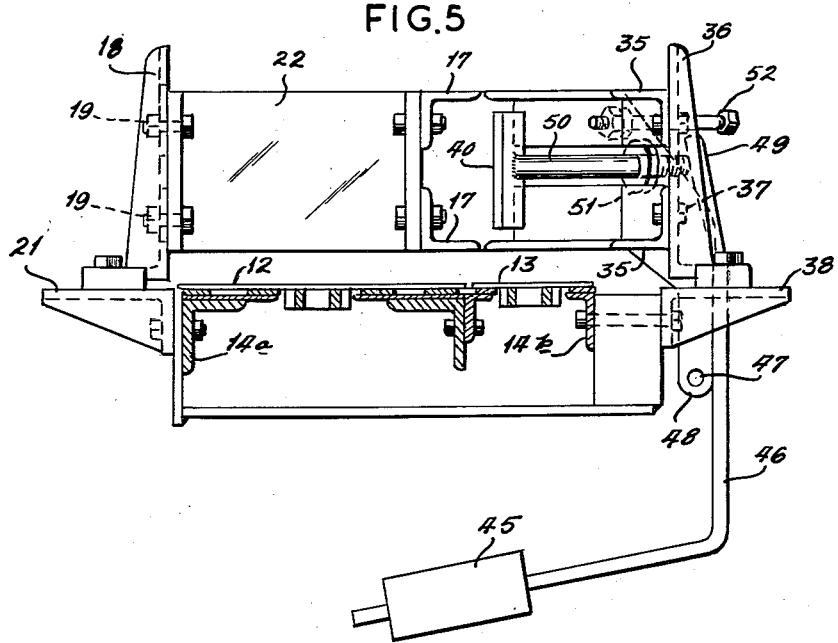
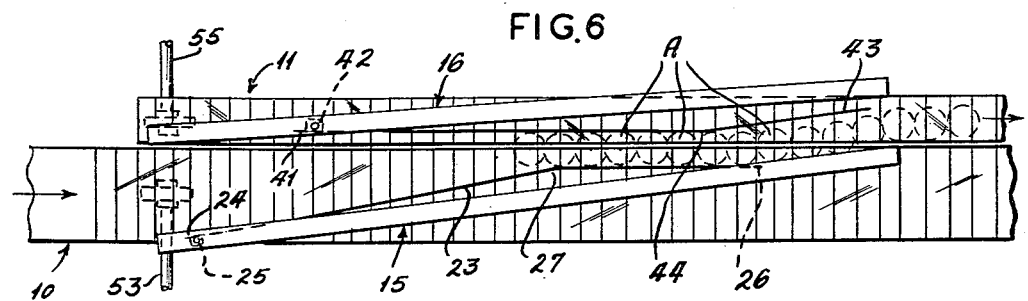
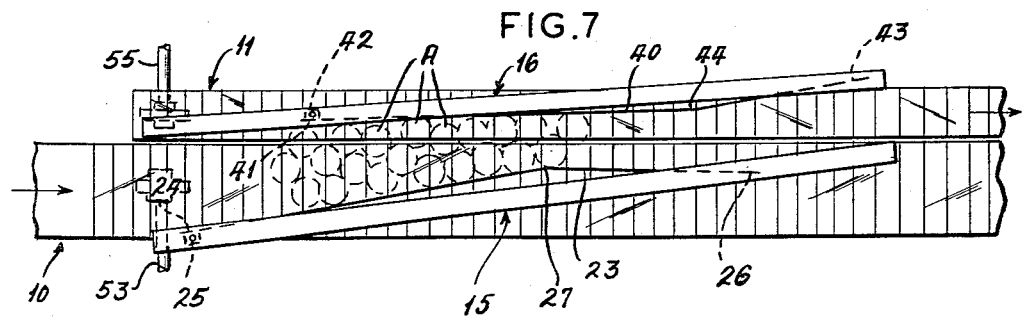
INVENTORS
WILLIAM J. NEKOLA
MOMIR BABUNOVIC
By Gravely, Lieder & Woodruff
ATTORNEYS

United States Patent Office 3,117,665
Patented Jan. 14, 1964

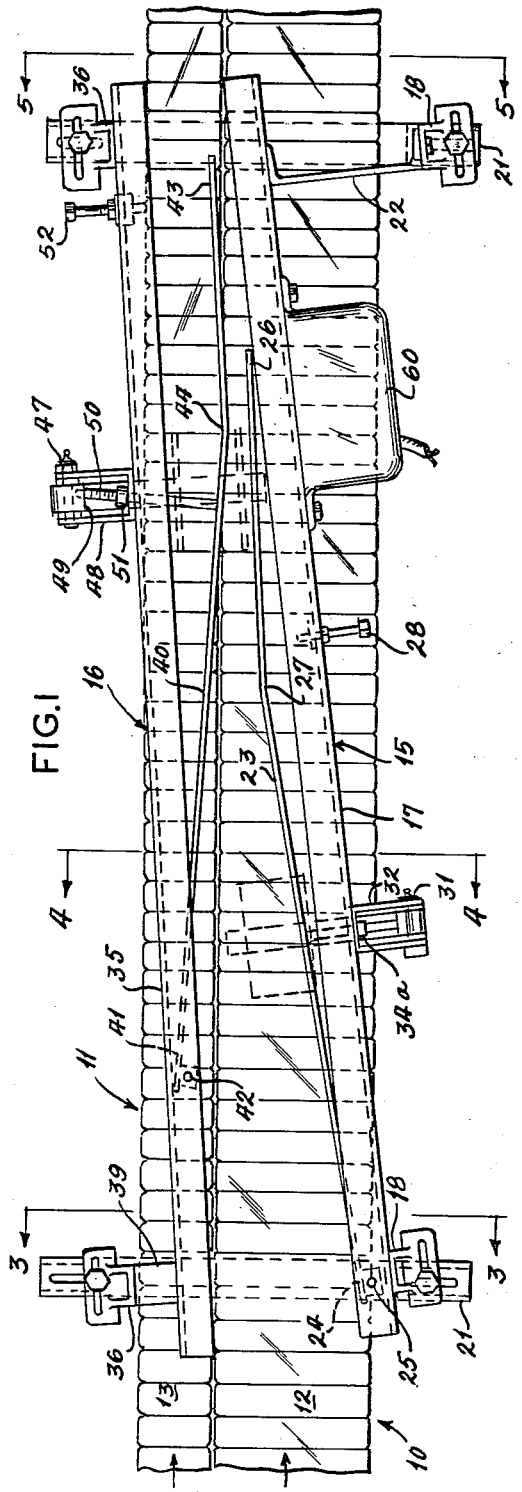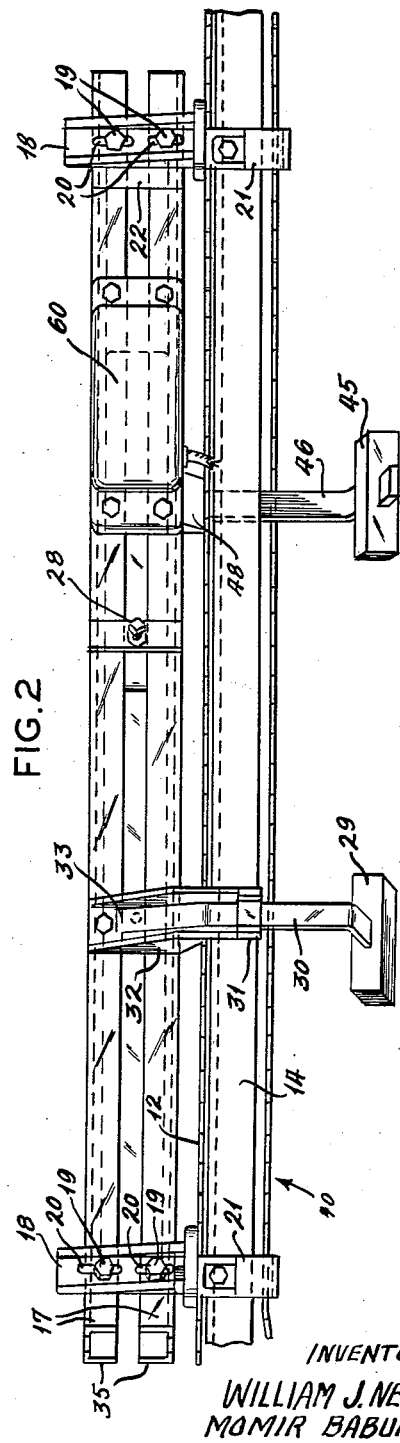

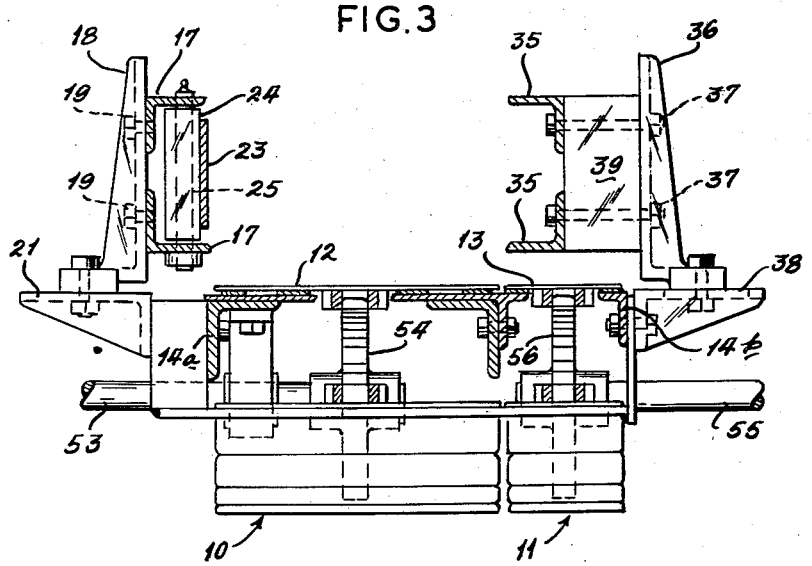
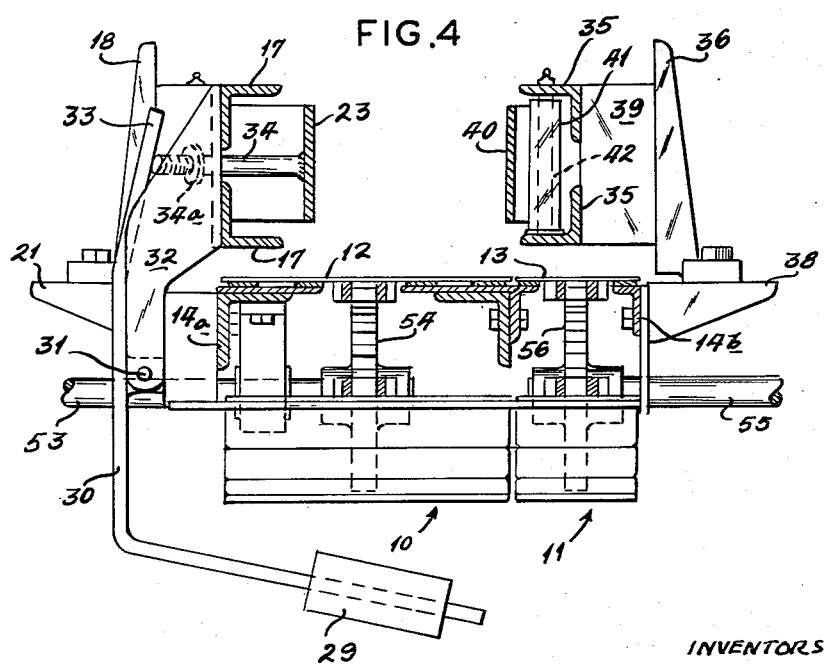

3,117,665
ARTICLE COMBINER FOR CONVEYORS
William J. Nekola, Normandy, and Momir Babunovic, Kirkwood, Mo., assignors to Barry-Wehmiller Machinery Company, St. Louis, Mo., a corporation of Missouri
Filed Aug. 28, 1961, Ser. No. 134,379
9 Claims. (Cl. 198—30)

This invention relates to improvements in conveyor systems whereby articles moved by a conveyor are handled and controlled in a random mass to reduce the mass to an orderly flow for feeding a processing machine or the like.

The handling of large numbers of articles, especially frangible articles like glass bottles, in a mass flow having no particular pattern but moving in random or disorderly fashion has been a source of concern. Many efforts have been made to devise simple and workable means to solve this problem, and in most instances the result has left much to be desired. The problem is often time serious when mass control is required for articles being fed to a processing machine which must receive articles in a well regulated pattern in order to meet processing speeds and thereby achieve production efficiency and the consequent economy of overall operation.

The present invention embodies a highly successful arrangement for mass control of articles and largely solves the existing problems, and it is a principal object to provide the unique and simple means hereinafter disclosed to overcome the existing troubles first stated.

It is also an object of this invention to provide article control means for conveyor systems in which the flow of articles is smoothly performed from a disorderly mass to a desired flow without the usual threat of jamming the articles during the transition from the disorderly mass.

It is a further object of this invention to provide improved means to achieve an uninterrupted flow of articles from a disorderly mass to obtain a constant alignment of articles in at least a single row.

It is a still further object of this invention to provide improved means as stated above and to achieve automatic self-adjusting response for slow or fast rates of flow.

In a preferred embodiment of this invention the improved combiner means may comprise cooperating yieldable guides converging in the direction of flow to funnel a disorderly mass of articles into a constant alignment of articles. In actual practice response of the yieldable guides in deflection under force applied by the flow of articles is automatically varied by asymmetrically supporting and differentially loading guides so that there is produced an ever changing degree of yield or deflection in the guides as the articles flow relative thereto, whereby the articles are prevented from forming a bridge or "log jam" at any point. The yielding action of the guides is most effective when the maximum flow of articles is reached, and as the flow decreases the guides react to the decrease in pressure of the articles to maintain constant control with the eventual reaction that a few articles reaching the guides may result in temporary stoppage since the guides may exert a pressure on the articles sufficient to overcome the friction of the conveyor surface on the bottoms thereof. This latter operation is beneficial as it stabilizes the flow pattern at the delivery side.

Having set forth certain objects of a preferred embodiment, it is to be understood that additional objects and resulting advantages thereof will appear as the invention is described hereinafter with reference to the accompanying drawings, wherein:

FIG. 1 is a top plan view of so much of the improved article combiner means as will serve to impart a full understanding of the present invention;

FIG. 2 is a side elevational view of the means shown in FIG. 1;

FIG. 3 is a transverse sectional view taken at line 3—3 in FIG. 1;

FIG. 4 is a further transverse sectional view taken at line 4—4 in FIG. 1;

FIG. 5 is still another transverse and partly sectioned view taken at line 5—5 in FIG. 1;

FIG. 6 is a schematic plan view of the article combiner means shown in FIG. 1 when operating at a minimum flow of articles; and FIG. 7 is another schematic plan view of the same means when subjected to mass flow of articles.

Referring to FIGS. 1 and 2, the means of this invention is adapted for a conveyor system in which a supply conveyor 10 and a delivery conveyor 11 are arranged in side-by-side relation with the article supporting surfaces 12 and 13 thereof positioned at the same elevation. A suitable frame 14 supports the article carrying span of each conveyor, and as the frame is relatively unimportant it has been shown in brief detail in FIGS. 3, 4 and 5. The supply conveyor 10 may have a speed slower than conveyor 11 and it is wider so as to handle the mass flow of articles. Conveyor 11 is made sufficiently wide to carry the largest size article to be handled in single file order.

Control of the articles is performed by cooperating guide means 15 and 16 disposed in operative positions adjacent the conveyor surfaces 12 and 13. The guide 15 may be made up of rigid rail members or angles 17 supported by brackets 18 in spaced relation with securing elements 19 inserted through slots 20 in the brackets so that the members 17 may be vertically adjusted. Each bracket 18 is carried on a second bracket 21 secured to an adjacent part 14a of the frame 14. The bracket 18 in FIG. 5 is provided with a suitable extension 22 which supports the adjacent ends of the rail members 17 over the conveyor 10 and adjacent the conveyor 11. The rails 17 constituting the guide 15 are horizontally adjustable on the frame supported brackets 21. The guide 15 is provided with a movable or yieldable bar 23 (FIGS. 1, 3 and 4) which is pivoted at its end 24 on a vertical pin 25. The bar extends along the rail members 17 toward the opposite end 26, and between the ends there is an elbow or bend 27. A stop element 28 carried by the rail members is adjustable to set the limit of movement of the bar 23 into the rail members 17. On the other hand pressure is constantly exerted on the bar 23 to hold it extended from between rails 17, and this pressure is conveniently obtained by a counterweight 29 (FIGS. 1, 2 and 4) adjustably supported on the arm 30 pivoted at 31 on the bracket 32. The arm 30 has its end portion 33 located to engage a push pin 34 secured to the bar 23.

The guide 16 of FIG. 1 is also seen in FIGS. 3, 4 and 5. It comprises rigid rail members or angles 35 adjustably attached to brackets 36 by elements 37, the brackets 36 being adjustably carried by other brackets 38 supported by the adjacent part 14b of the general frame assembly 14. The members 35 are supported on the left hand bracket 36 in FIG. 1 by an extension piece 39 since this end of the guide 16 is located adjacent the margin of conveyor surface 12 and prevents articles moving over to conveyor surface 13 until the articles have traversed the guides 15 and 16. Guide 16 carries a movable or yieldable bar 40 which is pivoted at its end 41 upon a vertical pin 42. Bar 40 extends lengthwise of and between the rail members 35 toward the opposite end 43 and is provided between its ends 41 and 43 with an elbow or bend 44. The bar 40 is pivoted about the pin 42 in the direction toward the rigid members 35 by the articles being conveyed, and is urged in the opposite direction by a counterweight 45 adjustably mounted on an arm 46 which is pivoted at 47 in a support bracket 48 carried by the frame 14. The upper end 49 of the counterweighted arm 46 is positioned to engage the outer end of a push pin 50 which is carried by the bar 40 in position to pass between the rails 35. The outer end of the pin 50 is threaded to receive a stop nut 51 which checks the outward pivoting displacement of bar 40. The extent of inward movement of bar 40 is determined by the stop element 52.

The means to drive the conveyors 10 and 11 is not shown in detail. However, it is understood that suitable motor means may be connected to the drive shaft 53 (FIGS. 3, 4, 6 and 7) to operate conveyor 10 through the sprocket 54. Similarly, motor means may be connected to the drive shaft 55 to operate conveyor 11 through its sprocket 56. The separate drives for conveyors 10 and 11 will permit the wider conveyor surface 12 to be driven at a slower speed than the conveyor surface 13 so that a larger mass of articles moving relatively slowly may be combined and handled by this device to form a single file thereof moving at a faster pace.

The operation of the invention will now be described in connection with FIGS. 6 and 7, but frequent reference will be made to the other views. At the outset is should be remembered that the device may be set for any desired article size (diameter) capable of being handled by the outlet conveyor 11. To make the proper setting the rigid rails 17 and 35 of the guides 15 and 16 respectively are adjusted so that the outlet ends are spaced apart approximately to match the article size, and they are aligned with the conveyor 11. This adjustment for a large size article is shown in FIGS. 1, 6 and 7. Next, attention is directed to the initial setting of the bars 23 and 40 relative to the rails 17 and 35 respectively. It is observed that the free ends 26 and 43 are extended so as to assume positions relatively close together, thereby forming the sides of a path which converges from the inlet at the left to the elbow 27 of bar 23 and thereafter has a "dog leg" path which is also convergent. The bars 23 and 40 are normally held in such positions by the respective counterweights 29 and 45. Since the bars are unopposed by the presence of articles, the counterweights will hold the same extended to the limit of the adjustable stop element 34a on the pin 34 for bar 23 (FIG. 4) and to the limit of the stop element 51 on pin 50 for bar 40 (FIG. 5).

Referring now to FIG. 6, it is seen that the conveyors 10 and 11 are carrying a few articles A and the bars 23 and 40 have, due to the side pressure exerted by the bars under the counterweight loading, caused the articles to arrange themselves in a single file pattern. As there are no following articles, the conveyor 11 will carry the lead-in articles on and approximately four or five articles will remain in the space between the bars held there by the frictional restrain of the bars which is greater than the friction between the bottoms of the articles and the conveyor surfaces 12. This restrain also acts to stabilize the flow pattern. The device is, therefore, normally adjusted to hold approximately four or five articles from passing the bars 23 and 40. Also the conveyor 11 is operated at a faster speed than conveyor 10 and is adjusted to the desired capacity of the machine or article processing equipment it serves.

As the mass of articles A increases, the bars 23 and 40 will spread and change the positions of the respective counterweights 29 and 45, which change increases the side loading on the articles and causes the articles to push back on the bars with consequent flexing of the bars. The flexing of the bars is partly regulated by the elbows 27 and 44 and partly affected by the pivoted nature thereof. This flexing is heightened by the off-set pivots 25 and 42 for the bars 23 and 40, and by the off-set relationship of the counterweight force application at pins 34 and 50, the off-set elbows 27 and 44 and the different lengths of the bars presented for contact by the articles. Thus the asymmetric relationship of the shape, mounting, and points of counterweight loading contribute to the working of the bars such that the bars develop a kneading action on the articles A to work, press and arrange the articles in a pattern of flow such that if, for example, two articles happen to arrived exactly opposite each other between the bars and in advance of the elbow 27 (this would in other devices cause a jam), the two articles would force the bars apart and the bar 40 would flex more, since its elbow 44 is more removed, thus creating a different frictional drag effect on the sides of the articles which would result in one article advancing ahead of the other. This last described condition is assisted by the pressure of the following mass pushing on both articles and dislodging the article having the least frictional restraint. It is thought that the actions of bars 23 and 40 in the present device may be best described as a kneading action since the forces and movements are non-uniform and are asymmetrically located with the consequent result that the articles are automatically worked and kneaded into a flow pattern which constantly breaks up potential jams. The good effects of this invention are realized when the device is crowded to or near its capacity. The adjustability of the rails 17 and 35 vertically, horizontally and angularly adapts the device to a variety of article sizes. The present device may be applied to existing conveyor systems just as easily as to new systems, and its size is small enough to avoid space problems.

In FIGS. 1 and 2 there is shown a vibrator 60 of electrical type mounted on the rails 17 of the guide 15. The vibrator 60 may be any suitable means which will add a rapid and short amplitude motion to the guide 15 for augmenting the kneading action of both guides 15 and 16. This vibrator is useful for articles having irregular surfaces or odd shapes. One vibrator which is contemplated works on the electromagnetic make and break principle of the common buzzer or door bell, the essential modification including addition of sufficient mass to the vibrating member to make the rails 17 react.

Having described a preferred embodiment of the invention, it is understood that changes and modifications may be made in or be suggested by the embodiment disclosed. Of course, all such changes or modifications are desired to be covered by the appended claims.

What is claimed is:

1. An article combiner comprising, in combination, a first conveyor, a haphazard mass of articles moved by said first conveyor, a second and adjacent conveyor to receive said articles, and article guiding means adjacent said conveyors to guide the mass of articles moved by said first conveyor into a uniform flow of articles received by said second conveyor, said guiding means including spaced article kneading bars each having one end pivotally supported in fixed spaced relation and arranged adjacent said first conveyor, said bars extending lengthwise of the combiner with one bar angularly crossing over a conveyor, and each bar having its opposite end unsupported, said bars each having a bend intermediate its ends with the bends asymmetrically related and the bars cooperating to define the sides of an article flow path converging from said pivotally supported ends toward said unsupported ends, and load applying means operatively connected to each bar and acting to exert a force upon the bar displacing the same toward the articles flowing between said bars upon said conveyors, said bars and load applying means acting on the articles to knead, press and work the same into a uniform flow received on said second conveyor.

2. An article combiner comprising, in combination, a first conveyor, a haphazard mass of articles moved by said first conveyor, a second and adjacent conveyor to receive said articles, and article guiding means adjacent said conveyors to guide the mass of articles moved by said first conveyor into a uniform flow of articles received by said second conveyor, said guiding means including spaced article kneading bars each having one end pivotally supported in spaced relation to provide therebetween an entrance for articles adjacent said first conveyor, said bars extending lengthwise of the combiner with one bar substantially over said second conveyor, each of said bars having the opposite end unsupported, said bars each having a bend intermediate its ends with the bends asymmetrically related and the bars cooperating to define the sides of an article flow path converging from said pivotally supported ends toward said unsupported ends, and load applying means operatively connected to each bar, said load applying means being asymmetrically related and acting to exert a force thereon displacing the same toward the articles flowing between said bars upon said conveyors, said bars and load applying means acting on the articles to knead, press and work the same into a uniform flow received on said second conveyor.

3. An article combiner for conveyor systems having adjacent conveyor spans moving in the same direction and providing article supporting surfaces at the same elevation, said article combiner including spaced frame means extending along the conveyor surfaces, said frame means having adjacent ends aligned with one conveyor forming an article receiving inlet and the opposite ends aligned with the other conveyor forming an article discharge outlet, article guide means movably mounted on each frame means by a pivot at its end nearest the article receiving end of the frame means and said guide means being arranged in spaced relation and defining the sides of a passage converging from said article receiving inlet toward said discharge outlet, each article guide means having a bend intermediate its length with the bends in non-aligned relation crosswise of the conveyor, stop means carried by each frame means between the bend in its guide means and the outlet end therefrom, said stops limiting the separation of the guide means and being in non-aligned relation crosswise of the conveyor, and means operatively connected to each guide means to exert a yieldable force thereon directed to move said guide means toward each other.

4. In an article combiner for a conveyor system having adjacent conveyor spans moving in the same direction and providing article carrying surfaces at the same elevations, the improvement which includes spaced frames disposed over the conveyors with article receiving ends adjacent one conveyor and article discharge ends adjacent the other conveyor, a first article guide bar pivoted to one frame adjacent the receiving end and extending therealong to an opposite free end, load applying means operatively connected to said first bar intermediate its ends and acting to displace said bar outwardly of said one frame over the said one conveyor, a second article guide bar pivoted to the other frame and spaced from its receiving end, said second bar extending along the other frame to an opposite free end, separate load applying means operatively connected to said second bar intermediate its ends and acting to displace said bar outwardly of said other frame over the other conveyor, and each of said bars having a bend between its ends spaced from the adjacent load applying means, said bars being normally spaced apart and defining the sides of an article flow path which converges from the article receiving ends of said frames toward the article discharge ends thereof.

5. In an article combiner for a conveyor system having conveyor means providing an article supporting and moving surface, the improvement which includes a first article guide member pivoted adjacent the article receiving end and extending lengthwise of the conveyor means to an opposite free end, a first stop element adjacent said free end to limit displacement of said first member about its pivoted end, a second article guide member pivoted adjacent the article receiving end and extending lengthwise of the conveyor means to an opposite free end and a second stop element adjacent said second guide member located inwardly of its said free end to limit displacement of said second guide member about its pivoted end, said pivoted ends for said guide members being off-set lengthwise of the conveyor means and said stop elements also being off-set lengthwise of the conveyor means with said second stop element positioned intermediate the distance between said pivoted end and stop element for said first member, said first and second article guide members being spaced apart to define the sides of an article flow path which converges from the article receiving ends toward the opposite free ends thereof.

6. In an article combiner for a conveyor system having conveyor means providing an article supporting and moving surface, the improvement which includes a first article guide member pivoted adjacent the article receiving end and extending lengthwise of the conveyor means to an opposite free end, a first stop element adjacent said free end to limit displacement of said first member about its pivoted end, a second article guide member pivoted adjacent the article receiving end and extending lengthwise of the conveyor means to an opposite free end, and a second stop element adjacent said second guide member located inwardly of its said free end to limit displacement of said second guide member about its pivoted end, said pivoted ends for said guide members being off-set lengthwise of the conveyor means and said stop elements also being off-set lengthwise of the conveyor means with said second stop element positioned intermediate the distance between said pivoted end and stop element for said first member, said first and second article guide members being yieldable to deflect under pressure of articles between the pivoted ends and the said stop elements and being spaced apart to define the sides of an article flow path which converges from the article receiving ends toward the opposite free ends thereof.

7. Article conveying and arranging apparatus comprising, conveyor means having inlet and outlet ends and an article supporting span therebetween, yieldable article guiding and arranging members extending along said conveyor span and having article receiving ends in fixed spaced relation, said members being spaced apart to define a passage over said conveyor span converging toward said outlet end, and means in the apparatus to control the yieldable response of said members including at least one stop positioned adjacent each member to be engaged by said adjacent member at a different distance from said outlet end of said conveyor means, said yieldable members upon engaging said stops deflecting between said fixed ends and said stops under crowding of the articles on said conveyor span, said deflecting occurring at places non-aligned crosswise of said conveyor to work the articles in said converging passage therebetween into an orderly arrangement in advance of movement through said outlet end.

8. Article conveying and arranging apparatus including conveyor means having inlet and outlet ends and an article supporting span therebetween, yieldable article guiding members extending along said conveyor span and having article receiving ends in fixed spaced relation, said members being spaced apart to define a passage over said conveyor span and converging toward each other intermediate said fixed ends and the opposite ends thereof, means connected to said members and normally retaining said members in converging relation at a minimum spacing, stops in said apparatus adjacent each member and positioned to be engaged by said members at different distances from said outlet end of the conveyor means, said yieldable members deflecting at different places between said fixed ends and said stops under crowding of articles on said conveyor span to yieldably work the crowding articles in said converging passage into an orderly arrangement at the outlet end.

9. Article conveying and handling apparatus including, conveyor means forming a horizontal surface on which articles are conveyed between an inlet end and an outlet end, a pair of article guiding members spaced apart and extending along said conveyor means for receiving and guiding articles, said members having article receiving ends more widely spaced than other portions to provide an article guiding passage which converges toward article discharge ends of said members, each of said members responding to pressure of articles therebetween and being yieldable laterally of the passage, and means adjacent each member to limit its yieldable response to pressure of articles, said limit members being located at different distances from said beginning ends to cause different yielding responses of said members to the article flow.

References Cited in the file of this patent

UNITED STATES PATENTS

| | | |
|---|---|---|
| 2,560,995 | Stiles | July 17, 1951 |
| 2,771,176 | Clark | Nov. 20, 1956 |
| 2,936,060 | Carter | May 10, 1960 |